United States Patent
Jeong

(10) Patent No.: US 8,152,186 B2
(45) Date of Patent: Apr. 10, 2012

(54) SUSPENSION ARM

(75) Inventor: Pil Young Jeong, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 128 days.

(21) Appl. No.: 12/827,722

(22) Filed: Jun. 30, 2010

(65) Prior Publication Data

US 2011/0133422 A1 Jun. 9, 2011

(30) Foreign Application Priority Data

Dec. 4, 2009 (KR) ........................ 10-2009-0120128

(51) Int. Cl.
*F16C 11/06* (2006.01)
*F16C 11/08* (2006.01)
*B60G 3/04* (2006.01)

(52) U.S. Cl. ............ 280/124.134; 280/93.511; 403/134; 403/141; 403/132

(58) Field of Classification Search ............ 280/93.511, 280/124.134; 403/132–135, 122, 140–143
See application file for complete search history.

(56) References Cited

U.S. PATENT DOCUMENTS

| | | | | |
|---|---|---|---|---|
| 2,077,582 A * | 4/1937 | Peo | ................. | 403/37 |
| 2,631,044 A * | 3/1953 | Booth | ................. | 280/124.108 |
| 3,561,800 A * | 2/1971 | Hassan | ................. | 403/34 |
| 3,802,789 A * | 4/1974 | Patton et al. | ................. | 403/135 |
| 4,256,413 A * | 3/1981 | Abe | ................. | 403/282 |
| 5,752,780 A * | 5/1998 | Dorr | ................. | 403/135 |
| 5,813,789 A * | 9/1998 | Prickler et al. | ................. | 403/135 |
| 6,109,816 A * | 8/2000 | Iwasaki | ................. | 403/135 |
| 6,488,436 B1 * | 12/2002 | Modat | ................. | 403/135 |
| 6,773,196 B2 * | 8/2004 | Broker et al. | ................. | 403/133 |
| 7,090,425 B2 * | 8/2006 | Bohne et al. | ................. | 403/135 |
| 7,357,591 B2 * | 4/2008 | Broker et al. | ................. | 403/132 |
| 7,661,902 B2 * | 2/2010 | Brunneke | ................. | 403/141 |
| 2003/0170069 A1 * | 9/2003 | Suzuki et al. | ................. | 403/122 |
| 2004/0057781 A1 * | 3/2004 | Bohne et al. | ................. | 403/135 |
| 2005/0013657 A1 * | 1/2005 | Kondoh | ................. | 403/122 |
| 2009/0001681 A1 * | 1/2009 | Morales Arnaez | ..... | 280/124.134 |
| 2011/0221153 A1 * | 9/2011 | Bladt et al. | ............. | 280/124.106 |

FOREIGN PATENT DOCUMENTS

| | | | |
|---|---|---|---|
| JP | 58-146714 | A | 9/1983 |
| JP | 09-142117 | A | 6/1997 |
| JP | 10-100628 | A | 4/1998 |
| JP | 10-109511 | A | 4/1998 |
| JP | 10-151931 | A | 6/1998 |
| JP | 11-078454 | A | 3/1999 |
| JP | 11-351235 | A | 12/1999 |
| JP | 2000-255233 | A | 9/2000 |
| JP | 2002-127936 | A | 5/2002 |

(Continued)

*Primary Examiner* — Drew Brown
(74) *Attorney, Agent, or Firm* — Morgan, Lewis & Bockius LLP

(57) ABSTRACT

A suspension arm may include a metal portion including a hemispherical metal ball housing, a metal bushing housing, and a metal connecting portion, one end of the metal connecting portion being connected to the metal ball housing and the other end of the metal connecting portion being connected to the metal bushing housing, a bearing, made of synthetic resin material, disposed in and coupled to the metal ball housing, a ball stud, one end of which is disposed in and coupled to the bearing, and a reinforcement member, made of synthetic resin material, wrapping the metal portion and connecting the bearing to the metal ball housing.

19 Claims, 7 Drawing Sheets

FOREIGN PATENT DOCUMENTS

| | | |
|---|---|---|
| JP | 2004-168251 A | 6/2004 |
| JP | 2007-239846 A | 9/2007 |
| JP | 2008-189078 A | 8/2008 |
| KR | 2002-0062493 A | 7/2002 |
| KR | 10-2008-0022136 A | 3/2008 |
| KR | 10-2008-0023911 A | 3/2008 |

* cited by examiner (A)

(B)

(C)

SUSPENSION ARM

CROSS-REFERENCE TO RELATED APPLICATION

The present application claims priority to Korean Patent Application No. 10-2009-0120128 filed on Dec. 4, 2009, the entire contents of which is incorporated herein for all purposes by this reference.

BACKGROUND OF THE INVENTION

1. Field of the Invention

The present invention relates to a suspension system for a vehicle. More particularly, the present invention relates to a suspension arm made of metal and synthetic resin material.

2. Description of Related Art

Generally, a suspension system for a vehicle includes a chassis spring, which connects a vehicle body and an axle and relieves impacts transmitted from ground, a shock absorber, which is designed to smooth out or damp shock impulse, and dissipate kinetic energy, and a stabilizer, which relieves oscillation of a vehicle.

A suspension system may be divided into a front suspension system and a rear suspension system according to mounting position, and the front suspension system connects a frame and an axle to support a vehicle body, absorbs impact of wheels and simultaneously a parts of a steering is mounted thereof.

The front suspension system is mainly divided into a rigid axle suspension and an independent suspension, and recently the independent suspension has been primarily used for a passenger car, and the rigid axle suspension has been used for a heavy vehicle such as a bus or a truck.

The independent suspension is mainly divided into a Wish Bone type and a Strut or Mcpherson Type, and each wheel of the independent suspension is attached to the frame independently, so that a road bump affecting one wheel has no effect on the others.

A suspension system, so called a control arm, is one of main element in the suspension system and connects wheels, braking system and so on to the vehicle body.

The suspension arm requires high rigidity against vibration and lightweight so that materials for the suspension arm are changed from steel to aluminum or plastic and also the suspension arm with high rigidity and lightweight is not cost competitive.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a suspension arm with high rigidity and lightweight at a competitive price.

In an aspect of the present invention, the suspension arm may include a metal portion including a hemispherical metal ball housing, a metal bushing housing, and a metal connecting portion, one end of the metal connecting portion being connected to the metal ball housing and the other end of the metal connecting portion being connected to the metal bushing housing, a bearing, made of synthetic resin material, disposed in and coupled to the metal ball housing, a ball stud, one end of which is disposed in and coupled to the bearing, and a reinforcement member, made of synthetic resin material, wrapping the metal portion and connecting the bearing to the metal ball housing.

The reinforcement member may cover an inner surface of the metal ball housing to connect the bearing to the metal ball housing.

A burr may be formed to the metal ball housing and protrudes with a predetermined thickness in order for the reinforcement member to enhance coupling force.

A connecting hole may be formed to the metal ball housing in order for the reinforcement member to enhance coupling force.

The bearing may include a first bearing member and a second bearing member, each having connecting surfaces respectively, and the first bearing member and the second bearing member are connected by the connecting surfaces for wrapping the one end of the ball stud.

The connecting surfaces of the first bearing member and the second bearing member may be formed along length direction of the ball stud, wherein the coupled connecting surfaces of the first bearing member and the second bearing member have an acute angle with a longitudinal axis of the ball stud.

A connecting protrude portion may be formed to the connecting surface of the first bearing member, a protrude connecting hole may be formed to the connecting surface of the second bearing member, and the connecting protrude portion may be inserted into the protrude connecting hole.

A lattice shaped of an embossed carving or an engraving may be formed to an outer surface of the bearing and the reinforcement member may be applied thereto in order for the reinforcement member to enhance coupling force.

The reinforcement member may be integrally formed together with the metal ball housing, the metal bushing housing and the metal connecting portion through an insert injection molding process.

The reinforcement member may be integrally formed together through an insert injection molding process after connecting first bearing member and the second bearing member by wrapping the one end of the ball stud, and disposing the first and second bearing members and the one end of the ball stud in the metal ball housing.

At least a connection reinforcement hole may be formed along the metal connecting portion in order that the reinforcement member is inserted into the at least a connection reinforcement hole to enhance coupling force.

In another aspect of the present invention, the suspension arm may include a connecting annulus formed to the one end of the metal connecting portion, and the metal ball housing inserted into the connecting annulus, wherein: the bearing comprises a first bearing member and a second bearing member, each having connecting surfaces respectively, the connecting surfaces of the first bearing member and the second bearing member are formed along length direction of the ball stud, and the first bearing member and the second bearing member are connected by the connecting surfaces for wrapping the one end of the ball stud.

The reinforcement member may be integrally formed together with the metal ball housing, the connecting annulus, the metal bushing housing and the metal connecting portion through an insert injection molding process.

As described above, a suspension arm according to an exemplary embodiment of the present invention can be formed by metal material and synthetic resin material so that the suspension arm may have high rigidity and lightweight at a competitive price.

The methods and apparatuses of the present invention have other features and advantages which will be apparent from or are set forth in more detail in the accompanying drawings, which are incorporated herein, and the following Detailed

Figure 1:
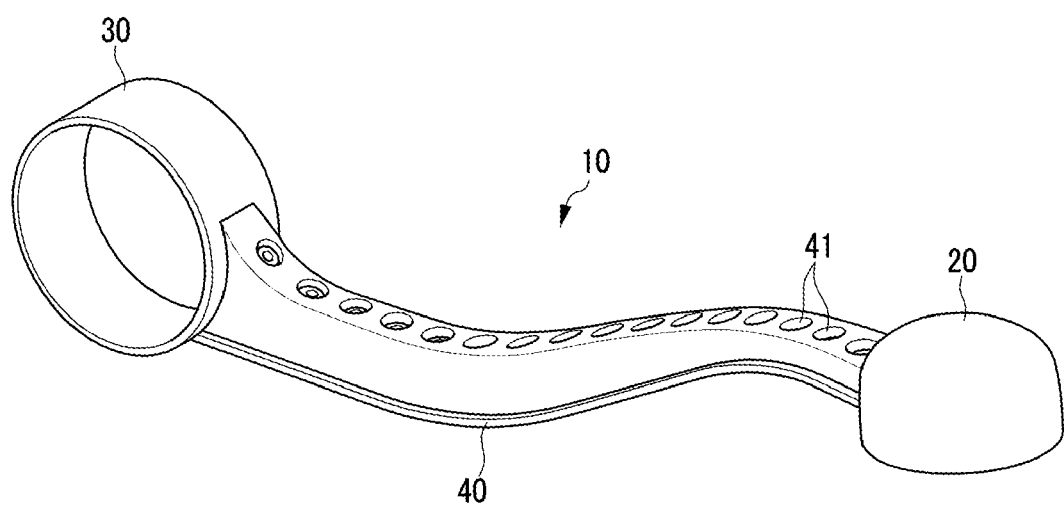
FIG. 1 is a perspective view of a metal ball housing, a metal bushing housing and a metal connecting portion of an exemplary suspension arm according of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Figure 2:
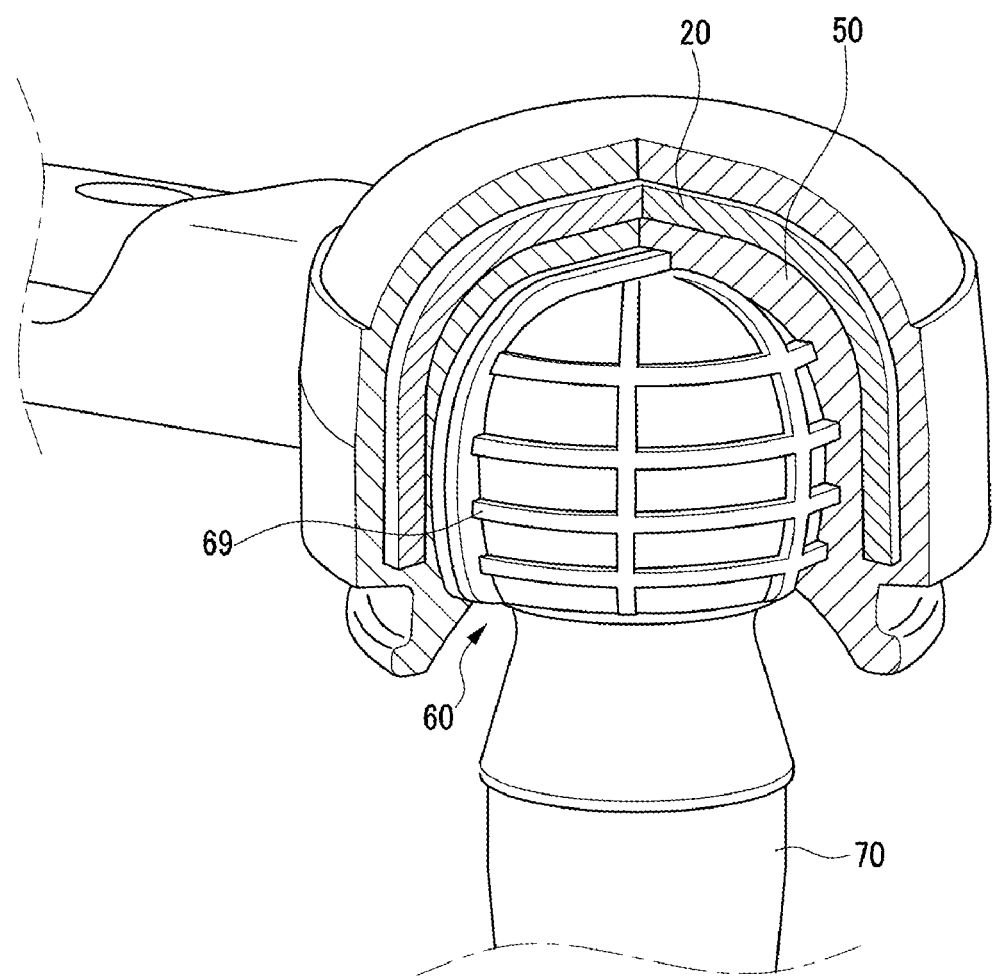
FIG. 2 is a partial cross-sectional view showing connection of the metal ball housing and a ball stud of the exemplary suspension arm according to the present invention.

FIG. 1 is a perspective view of a metal ball housing, a metal bushing housing and a metal connecting portion of a suspension arm according to the first exemplary embodiment of the present invention and FIG. 2 is a partial cross-sectional view showing connection of the metal ball housing and a ball stud of the suspension arm according to the first exemplary embodiment of the present invention.

Figure 4:
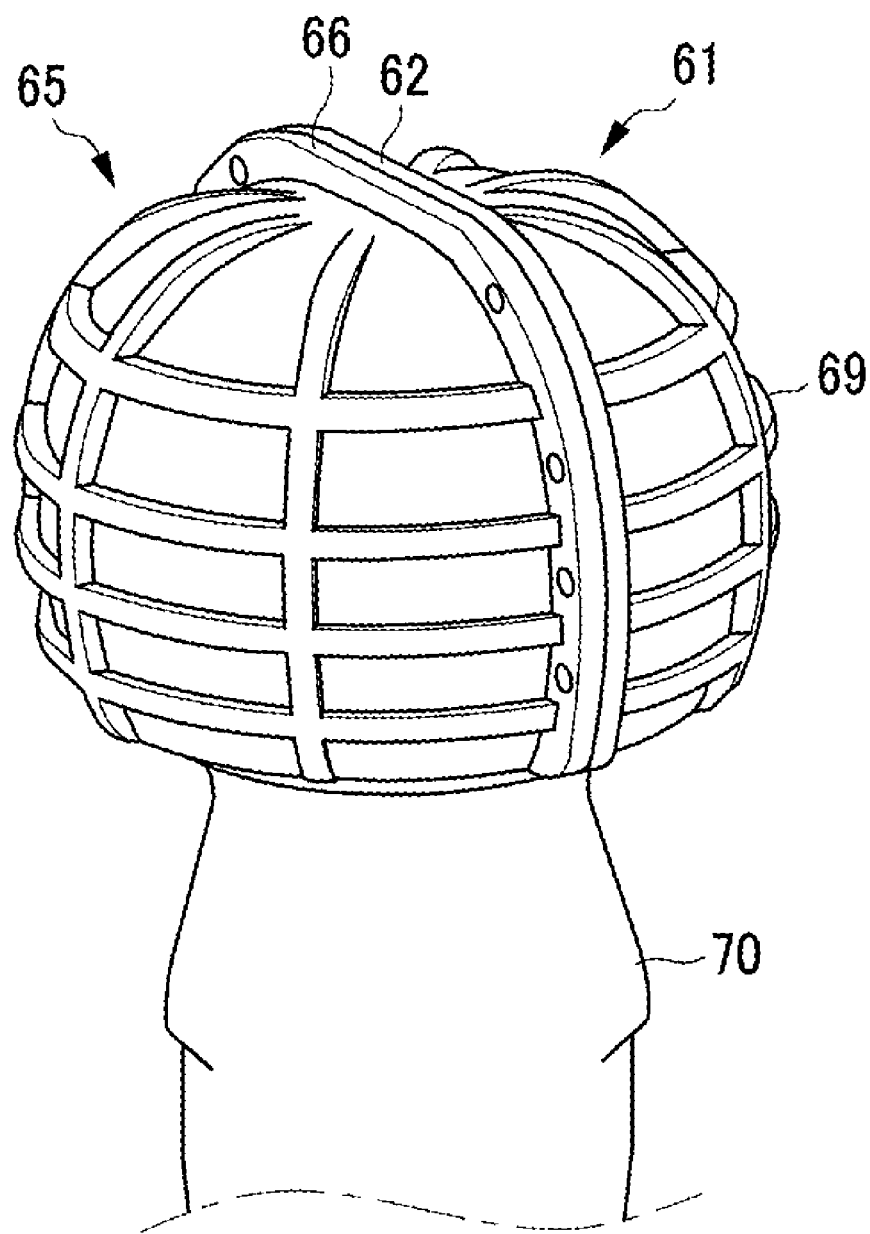
FIG. 4 is a perspective view of a bearing of the exemplary suspension arm according to the present invention.
Figure 5:
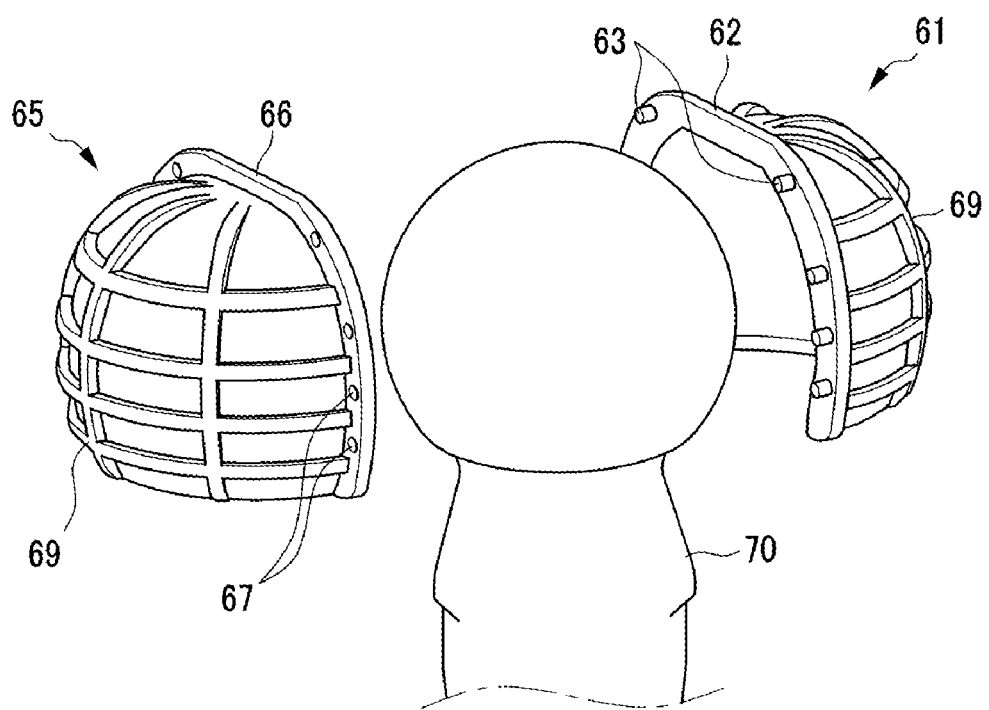
FIG. 5 is an exploded view of the bearing and the ball stud of the exemplary suspension arm according to the present invention.

FIG. 4 is a perspective view of a bearing of the suspension arm according to the first exemplary embodiment of the present invention, and FIG. 5 is an exploded view of the bearing and the ball stud of the suspension arm according to the first exemplary embodiment of the present invention.

Referring to FIG. 1, FIG. 2, FIG. 4 and FIG. 5, a suspension arm according to the first exemplary embodiment of the present includes a metal portion 10 including a hemispherical metal ball housing 20, a metal bushing housing 30, and a metal connecting portion 40 connecting the metal ball housing 20 and the metal bushing housing 30, a bearing 60, made of synthetic resin material, disposed to the metal ball housing 20, a ball stud 70 disposed to the bearing 60 and a reinforcement member 50, made of synthetic resin material, wrapping the metal portion 10 and connecting the bearing 60 to the metal ball housing 20.

The bearing 60 includes a first bearing member 61 and a second bearing member 65, each having connecting surfaces 62 and 66 respectively and the first bearing member 61 and the second bearing member 65 are connected by the connecting surfaces 62 and 66 for wrapping an end of the ball stud 70.

The connecting surfaces 62 and 66 of the first bearing member 61 and the second bearing member 65 are formed along length direction of the ball stud 70.

A connecting protrude portion 63 is formed to the connecting surface 62 of the first bearing member 61, a protrude connecting hole 67 is formed to the connecting surface 66 of the second bearing member 65 and the connecting protrude portion 63 is inserted into the protrude connecting hole 67.

The connection of the protrude portion 63 and the protrude connecting hole 67 can be slightly slanted against along direction of the ball stud 70, for example about 1°, so that the connection can be firmed.

A lattice 69 of an embossed carving or an engraving is formed to a surface of the bearing 60 in order for the reinforcement member 50 to enhance coupling force.

The reinforcement member 50 is integrally formed together with the metal ball housing 20, the metal bushing housing 30 and the metal connecting portion 40 through an insert injection molding process so that the metal portion 10 and the reinforcement member 50 are firmly connected with high rigidity and lightweight at a competitive price.

The reinforcement member 50 is integrally formed together through an insert injection molding process after connecting first bearing member 61 and the second bearing member 65 for wrapping an end of the ball stud 70 and disposing the bearing 60 to the metal ball housing 20.

A connection reinforcement hole 41 is formed to the metal connecting portion 40 and the reinforcement member 50 can be inserted into the connection reinforcement hole 41 for enhancing coupling force in molding process.

Figure 3:
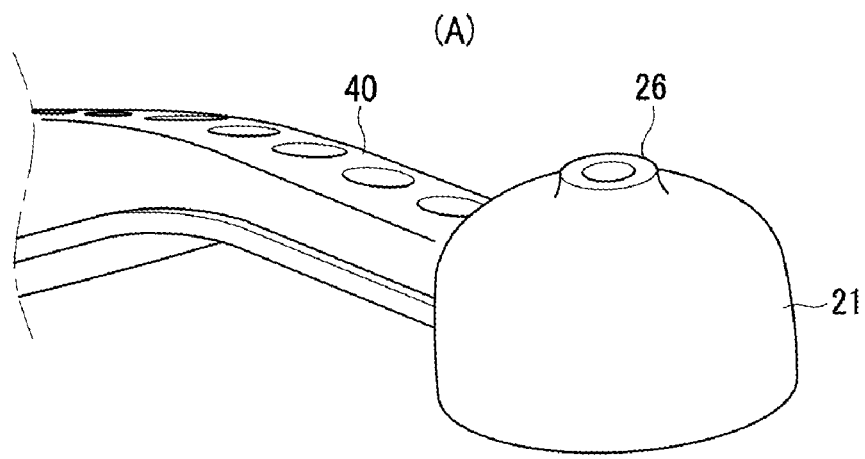
FIG. 3 is drawing showing a metal ball housing of the exemplary suspension arm according to the present invention.
Figure 3:
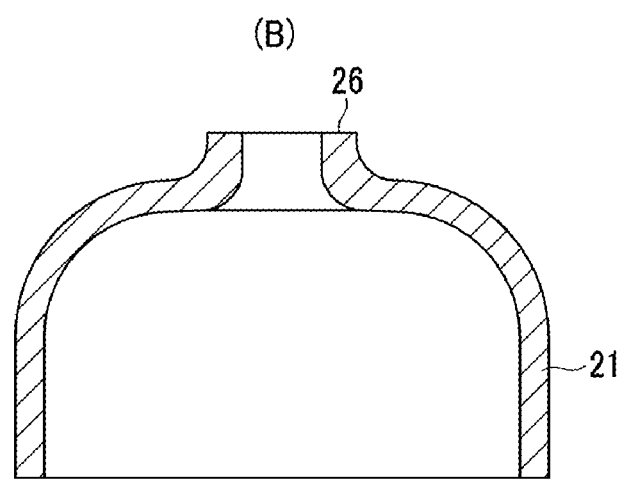
Figure 3:
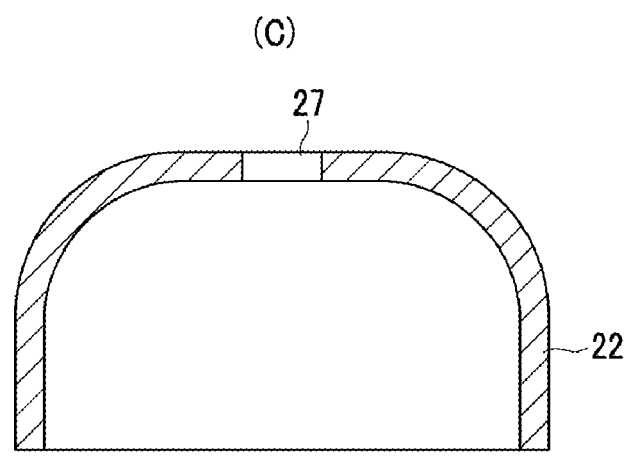

FIG. 3 is drawing showing a metal ball housing of the suspension arm according to an exemplary variation of the first exemplary embodiment of the present invention.

Referring to FIG. 3, a burr 26 or a connecting hole 27 is formed to a metal ball housing 21 and 22 in order for the reinforcement member 50 to enhance coupling force.

Figure 6:
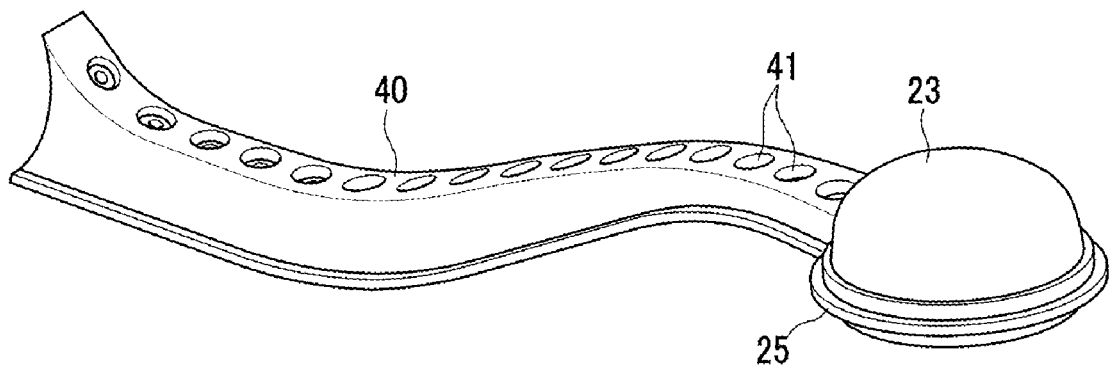
FIG. 6 is a perspective view showing connection of a metal ball housing and a metal connecting portion of an exemplary suspension arm according to the present invention.
Figure 7:
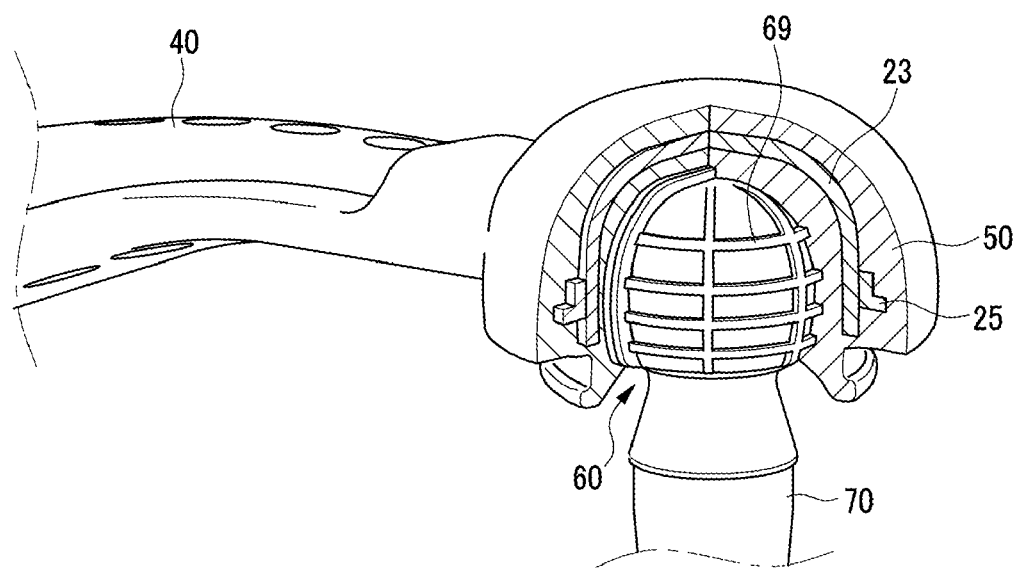
FIG. 7 is a partial cross-sectional view showing connection of the metal ball housing and a ball stud of the exemplary suspension arm according the present invention.

FIG. 6 is a perspective view showing connection of a metal ball housing and a metal connecting portion of a suspension arm according to the second exemplary embodiment of the present invention, and FIG. 7 is a partial cross-sectional view showing connection of the metal ball housing and a ball stud of the suspension arm according to the second exemplary embodiment of the present invention.

Comparing to the first exemplary embodiment of the present invention, a suspension arm according to the second exemplary embodiment of the present invention further includes a connecting annulus 25 to the metal connecting portion 40 and the metal ball housing 23 is inserted into the connecting annulus 25.

With connection of the metal ball housing 23 and the metal connecting portion 40 through the connecting annulus 25, welding and so on are not required so that manufacturing process can be simplified and also the connecting annulus 25 reinforces the metal ball housing 23.

As shown in FIG. 7, shape of the connection of the connecting annulus 25 and the metal ball housing 23 may enhance coupling force with the reinforcement member 50.

Excepting for the metal ball housing 23 and the connecting annulus 25, the suspension arm according to the second exemplary embodiment of the present invention has the same scheme of the suspension arm of the first exemplary embodiment of the present invention, so that detailed explanation will be omitted.

As described above, the suspension arm according to the exemplary embodiments of the present invention is made of metal material and synthetic resin material with high rigidity and lightweight at a competitive price.

For convenience in explanation and accurate definition in the appended claims, the terms "upper", "lower", "inner", and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A suspension arm comprising:
    a metal portion including a hemispherical metal ball housing, a metal bushing housing, and a metal connecting portion, one end of the metal connecting portion being connected to the metal ball housing and the other end of the metal connecting portion being connected to the metal bushing housing;
    a bearing, made of synthetic resin material, disposed in and coupled to the metal ball housing;
    a ball stud, one end of which is disposed in and coupled to the bearing; and
    a reinforcement member, made of synthetic resin material, wrapping the metal portion and connecting the bearing to the metal ball housing.

2. The suspension arm of claim 1, wherein the reinforcement member covers an inner surface of the metal ball housing to connect the bearing to the metal ball housing.

3. The suspension arm of claim 1, wherein a burr is formed to the metal ball housing and protrudes with a predetermined thickness in order for the reinforcement member to enhance coupling force.

4. The suspension arm of claim 1, wherein a connecting hole is formed to the metal ball housing in order for the reinforcement member to enhance coupling force.

5. The suspension arm of claim 1, wherein:
    the bearing comprises a first bearing member and a second bearing member, each having connecting surfaces respectively; and
    the first bearing member and the second bearing member are connected by the connecting surfaces for wrapping the one end of the ball stud.

6. The suspension arm of claim 5, wherein the connecting surfaces of the first bearing member and the second bearing member are formed along length direction of the ball stud.

7. The suspension arm of claim 6, wherein the coupled connecting surfaces of the first bearing member and the second bearing member have an acute angle with a longitudinal axis of the ball stud.

8. The suspension arm of claim 5, wherein:
    a connecting protruding portion is formed to the connecting surface of the first bearing member;
    a connecting hole is formed to the connecting surface of the second bearing member; and
    the connecting protruding portion is inserted into the connecting hole.

9. The suspension arm of claim 5, wherein a lattice shape of an embossed carving or an engraving is formed to an outer surface of the bearing and the reinforcement member is applied thereto in order for the reinforcement member to enhance coupling force.

10. The suspension arm of claim 1, wherein the reinforcement member is integrally formed together with the metal ball housing, the metal bushing housing and the metal connecting portion through an insert injection molding process.

11. The suspension arm of claim 10, wherein the reinforcement member is integrally formed together through an insert injection molding process after connecting the first bearing member and the second bearing member by wrapping the one end of the ball stud, and disposing the first and second bearing members and the one end of the ball stud in the metal ball housing.

12. The suspension arm of claim 1, further comprising at least a connection reinforcement hole that is formed along the metal connecting portion in order that the reinforcement member is inserted into the at least a connection reinforcement hole to enhance coupling force.

13. The suspension arm of claim 1, wherein:
    a connecting annulus is formed to the one end of the metal connecting portion; and
    the metal ball housing is inserted into the connecting annulus.

14. The suspension arm of claim 13, wherein:
    the bearing comprises a first bearing member and a second bearing member, each having connecting surfaces respectively;
    the connecting surfaces of the first bearing member and the second bearing member are formed along length direction of the ball stud; and
    the first bearing member and the second bearing member are connected by the connecting surfaces for wrapping the one end of the ball stud.

15. The suspension arm of claim 14, wherein the coupled connecting surfaces of the first bearing member and the second bearing member have an acute angle with a longitudinal axis of the ball stud.

16. The suspension arm of claim 14, wherein:
    a connecting protruding portion is formed to the connecting surface of the first bearing member;
    a connecting hole is formed to the connecting surface of the second bearing member; and
    the connecting protruding portion is inserted into the connecting hole.

17. The suspension arm of claim 14, wherein a lattice shape of an embossed carving or an engraving is formed to an outer surface of the bearing and the reinforcement member is applied thereto in order for the reinforcement member to enhance coupling force.

18. The suspension arm of claim 14, wherein the reinforcement member is integrally formed together with the metal ball housing, the connecting annulus, the metal bushing housing and the metal connecting portion through an insert injection molding process.

19. The suspension arm of claim 18, wherein the reinforcement member covers an inner surface of the metal ball housing to connect the bearing to the metal ball housing.

* * * * *